United States Patent [19]

Baumann

[11] Patent Number: 5,310,162
[45] Date of Patent: May 10, 1994

[54] ECCENTRICALLY ROTATABLE SLEEVE VALVE

[76] Inventor: Hans D. Baumann, 32 Pine St., Rye, N.H. 03870

[21] Appl. No.: 44,691

[22] Filed: Apr. 12, 1993

[51] Int. Cl.⁵ .............................................. F16K 31/52
[52] U.S. Cl. .................................... 251/258; 251/304
[58] Field of Search ............... 251/251, 257, 258, 331, 251/304, 901

[56] References Cited

U.S. PATENT DOCUMENTS

| | | | |
|---|---|---|---|
| 2,534,577 | 12/1950 | Courtot | 251/258 X |
| 2,812,154 | 11/1957 | Nordstrand | 251/251 |
| 2,948,504 | 8/1960 | Merrill | 251/258 |

*Primary Examiner*—Martin P. Schwadron
*Assistant Examiner*—Kevin L. Lee

[57] ABSTRACT

The Eccentrically Rotatable Sleeve Valve is comprised of a housing having a central, vertical bore retaining therein a flexible, tubular sleeve whose central portion can be eccentrically motivated towards or away from a valve seat which is located perpendicularly towards and at the center of the vertical bore, by a core element positioned inside the sleeve and which is capable of being radially displaced by a stem having eccentric cam means.

5 Claims, 1 Drawing Sheet

ECCENTRICALLY ROTATABLE SLEEVE VALVE

BACKGROUND OF THE INVENTION

This invention relates to packless control valves used to control the flow of fluid in a piping conduit. A typical example of a packless valve that may be used for this purpose is a diaphragm type valve as illustrated, for example, in my U.S. Pat. No. 4,609,178. These valves provide good closure means and are reasonably compact. However, since the diaphragm acts both as a closure member and a stem seal, these diaphragms must be fairly large and are typically two to three times the diameter of the valve orifice. The result is a requirement for substantial actuating forces to overcome the forces created by the diaphragm area times fluid pressure. If the diaphragm is made out of a plastic, such as PTFE (Polytetrafluoroethylene), routine repeated closure of such a diaphragm is not guaranteed due to the high mechanical stress imposed upon by the large flexible movement required for such a diaphragm. Another disadvantage of a diaphragm valve is their highly streamlined flow passage which can lead to cavitation and wear under high fluid velocities. Finally, the body size of a typical diaphragm valve is fairly large in comparison to the port opening which makes the construction of such a valve fairly expensive.

My invention overcomes these and other objections to valves of prior art by using a flexible tube as a closure element and stem sealing device. The flexible tube itself can be made from any commercial elastomeric or plastic, such as PTFE (Polytetrafluoroethylene) without imposing undue stresses on the material. The relatively small amount of radial displacement of the sealing material requires only moderate actuating forces which leads to substantial cost savings as far as actuating devices are concerned. In comparison to diaphragm valves, which have relatively large areas subject to fluid pressure and, therefore, high stresses, my flexible tube is supported over more than 90% of the exposed area by an interiorly placed mechanical element resulting again in relatively low stress levels, thereby guaranteeing a substantially higher number of life cycles. Another advantage lies in the fact that my sealing tube diameter is only about 65% larger than the valve port diameter, therefore, requiring a relatively small valve housing and valve closure flanges. Finally, my invention provides for a valve that can be utilized in full vacuum without fear of the sealing membrane collapsing under a negative pressure gradient as is the case with typical diaphragm valves. These and other important advantages will be explained more clearly by the following drawings and descriptions.

DESCRIPTION OF THE INVENTION

While the invention will be described in connection with a preferred embodiment, it should be understood that there is no intention to limit the invention to this specific embodiment.

Figure 1:
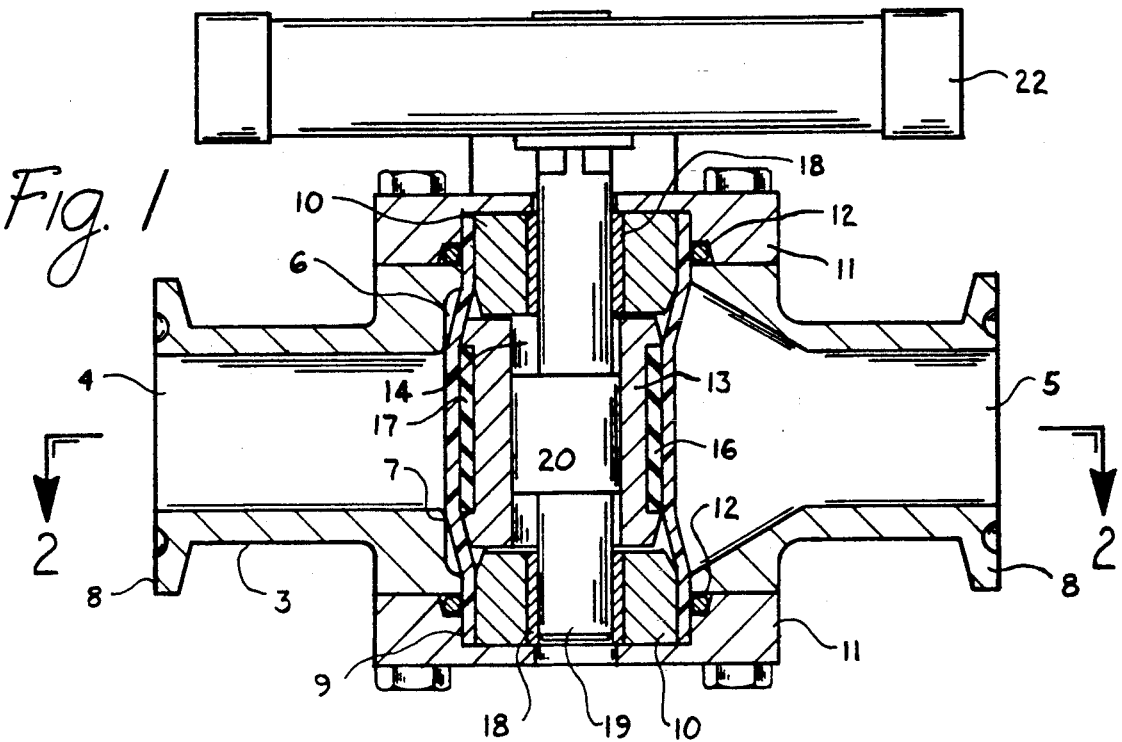
FIG. 1 is a vertical central, cross-sectional view of a preferred embodiment of my invention, where the valve is shown in the closed position.
Figure 2:
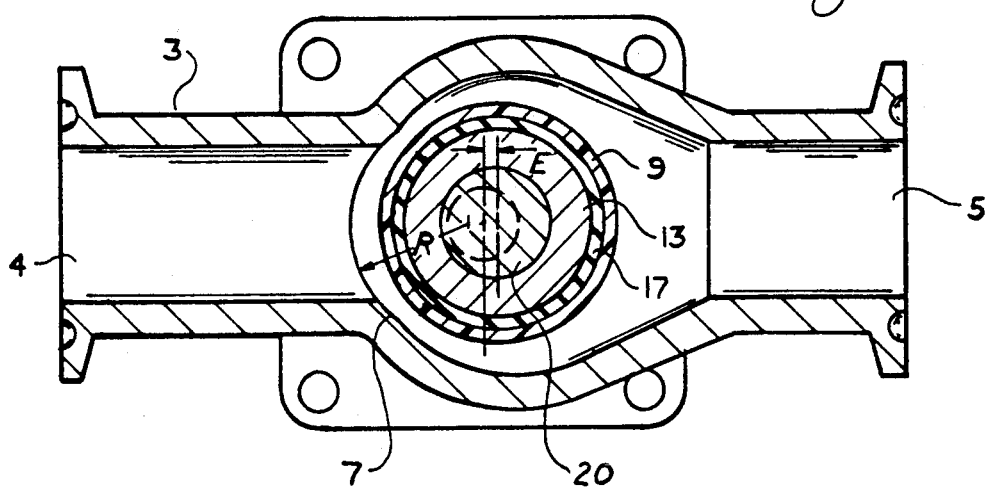
FIG. 2 is a horizontal, cross-sectional view of the device shown in FIG. 1 and following the line 2—2 in FIG. 1, and where the valve is shown in the open position.

Referring to FIG. 1, my invention is comprised of the valve housing 3 having an inlet port 4 and an outlet port 5. It should be understood that in order to function properly, inlet port 4 and outlet port 5 could easily be reversed and that the choice of location is purely one out of convenience. Valve housing 3 has a central, circular, perpendicular bore 6 and where the intersection between inlet port 4 and circular bore 6 provides for a cylindrical sealing surface 7 constituting a valve seat. Inlet port 4 and outlet port 5 have a flanged structure 8 suitable to connect to a fluid containing sanitary piping system. Circular bore 6 contains within a flexible tube or sleeve 9 which fits snugly into circular bore 6 and which is supported in the inside by two inserts 10, the latter being held in place by an upper and lower bonnet flange 11. Suitable O-ring seals 12 prevent fluid from leaking pas the sleeve and bonnet flange 11. The central interior of sleeve 9 is occupied by a barrel-shaped element 13 having a hollowed center portion 14. A portion of the outer circumference of the barrel-shaped element 13 has a recessed diameter 16 in which a relatively soft elastic material 17 is placed or glued to provide a soft support for the central portion of the flexible sleeve 9. Insert 10, furthermore, has a guide bushing 18 guiding therein a valve stem 19 which has a cylindrical central portion 20 whose center is off-set from the center of stem 19 by a distance "E" shown in FIG. 2. The upper extension of stem 19 engages an actuator 22 capable of rotating said stem by up to 180 degrees.

Referring specifically to FIG. 1, here we see stem 19 in the closed position, that is, the cylindrical portion 20 is displaced a the way towards inlet port 4 thereby forcing the barrel-shaped element 13 towards inlet port 4. This in turn will lead to an eccentric, radial displacement of the flexible sleeve 9 towards sealing surface 7, which will prevent fluid from inlet port 4 from flowing between sealing surface 7 and flexible sleeve 9 into body cavity 24 and from there to outlet port 5. This is the closed valve position. Upon actuation of the actuator 22, valve stem 19 is rotated in the opposite direction, which in turn forces barrel-shaped element 13 to move towards the outlet port 5 and forcing flexible sleeve 9 to disengage sealing surface 7 of housing 3 for free flow of fluid flow from inlet port 4 to outlet port 5. This will happen when the eccentric distance "E" is relocated a shown in FIG. 2. Since the flexible sleeve 9 may be made out of a corrosion resistant inert material such as PTFE (Polytetrafluoroethylene), which is a relatively hard material, a bubble tight contact to sealing surface 7 may not be possible especially since there may be additional mechanical misalignments present due to the effects of various machining tolerances. To overcome this problem, 1 have devised for an elastomeric support by adding a additional sleeve 17 between barrel-shaped element 13 and the flexible sleeve 9. This sleeve 17 is made from a relatively elastic material and, therefore, will compensate for any dimensional imperfections as described previously.

In order to limit the stress within sleeve 9 due to the eccentric displacement of the same, 1 find it advantageous to modify housing 3 somewhat by machining the radius "R" (see FIG. 2) defining the sealing surface 7 in a slightly off-set distance from the centerline of bore 6. While radius "R" is still identical to the radius of bore 6, the contact points for sleeve 9 is nevertheless relocated by the distance "E" from the center of bore 6. This causes sleeve 9 to make a camming or nutating motion towards valve seal 7m, a type of motion that gradually uncovers sealing surface 7 upon rotation of stem 19 to produce a flow versus rotational characteristic which is beneficial for automatic control purposes. If radius "R" would have originated from the centerline of bore 6, then the displacement of sleeve 9 would have been two times distance "E" in one direction leading to a substantial increase in stress caused by this movement.

Numerous modifications can be made to the invention without departing from the spirit of the following claims: for example, portion 20 might have additional bearing means to reduce rotating friction; a valve packing could be added around stem 19 for added protection; a separate seat ring (for example, made from stainless steel) could be added in housing 3 if the latter is made from an inexpensive metal such as cast iron, the non-displaced portion of the sleeve length could be completely retained within the housing bore itself, additional ports can be added, seal 12 could be imbedded into the upper surface of housing 3 instead of in flange 11 and so on.

Having thus described a typical embodiment, I hereby claim the following features of my invention:

1. Eccentrically Rotatable Sleeve Valve, comprising a housing having at least one horizontal inlet port and outlet port and one central opening extending essentially perpendicular to said inlet port, the interface between said horizontal inlet port and the perpendicular central opening constituting a valve seat, said valve seat having a radial surface and where the center of the radius is eccentrically displaced for the center of said central housing, a flexible sleeve inserted within said central opening, a barrel-shaped core having tapered ends snugly fitting within said flexible sleeve and where the length of the cylindrical portion of said core extends beyond the cross-sectional dimension of said inlet port and where the substantial length of is sleeve exposed within said housing is supported to withstand external fluid forces by said barrel-shaped core and its tapered ends, a shaft extending through the length of said central opening and having an eccentric element, said core having a bore cooperatively engaging with the shaft and having suitably configured portions to engage said eccentric element of the shaft nd capable of causing a nutating motion of said core toward said inlet port thereby forcing the central portion of said flexible sleeve to make a complimentary motion and thereby causing the sleeve to contact the valve seat in a camming motion and to close off and prevent fluid from flowing from the inlet to the outlet port upon sufficient rotational displacement of said shaft, tapered inserts snugly engaging the inside of said flexible sleeve above and below said core, and suitable closure means attached to either terminating end of said central opening to retain and seal said flexible sleeve and a portion of said tapered inserts.

2. Eccentrically Rotatable Sleeve Valve of claim 1, wherein said eccentric element of the shaft is comprised of a cylindrical central portion extending in diameter over that of said shaft and where the centerline of said cylindrical portion is off-set from that the of shaft.

3. Eccentrically Rotatable Sleeve Valve of claim 1, wherein said core has a recess within its outer circumferential periphery and where a suitable elastomeric insert is fastened within said recess in order to provide cushioning support for that portion of the flexible sleeve which can be in contact with the valve seat.

4. Eccentrically Rotatable Sleeve Valve of claim 1, wherein each of said closure means is comprised of a flange suitably attached to said valve housing and having a circular opening to snugly engage the upper or lower extremity of the flexible sleeve, and further having suitable sealed mounted between said flange, said housing, and the exterior of said flexible sleeve, and configured prevent fluid flow from said central opening past the exterior of said flexible sleeve and also from flowing between the housing and said flange.

5. Eccentrically rotatable Sleeve of claim 1, where the valve seat of said housing is eccentrically displaced from the censer of said central opening thereby forcing said sleeve to displace eccentrically nd radially in order to make a sealing contact with said valve seat.

* * * * *